Figure 1:
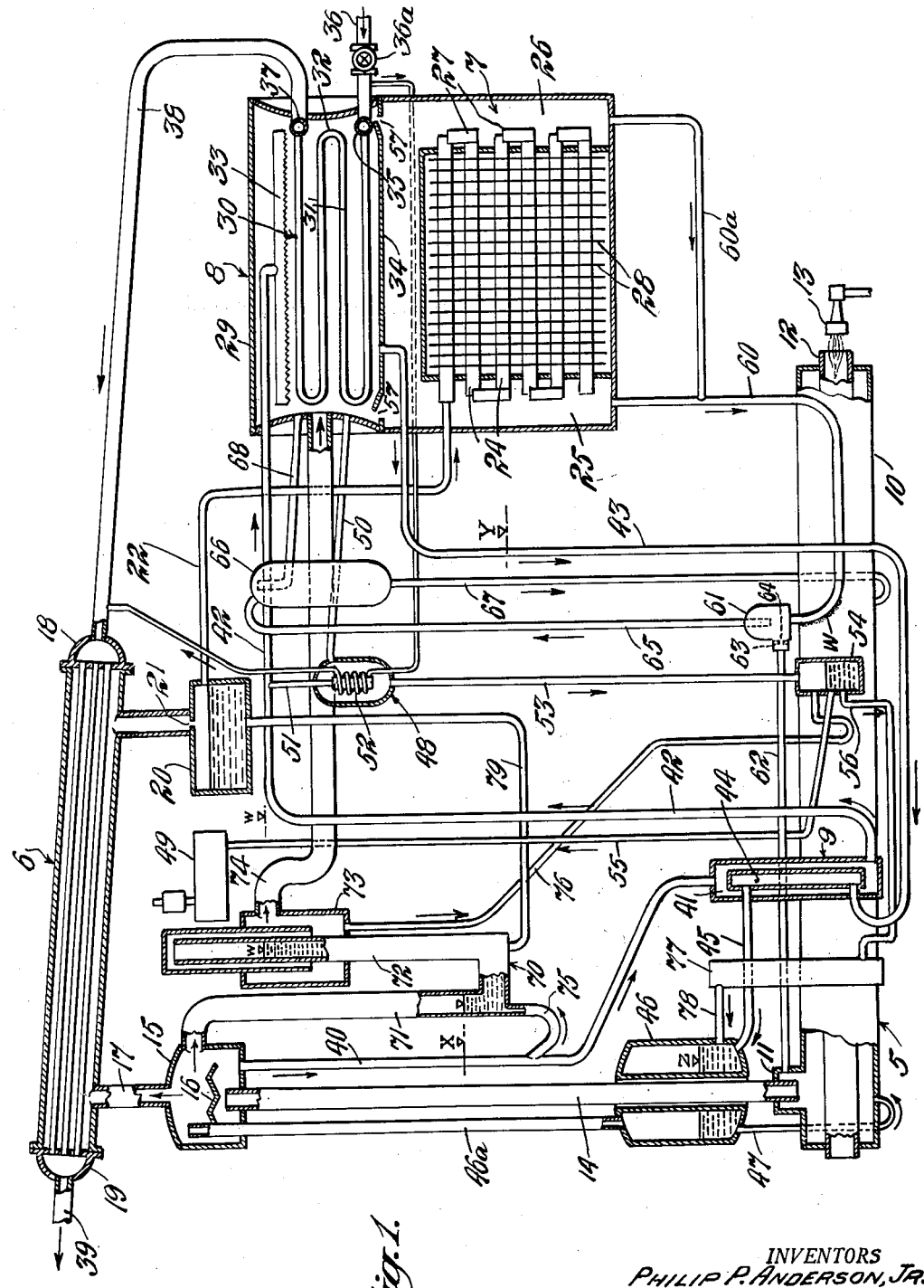

INVENTORS
PHILIP P. ANDERSON, JR.
EDWARD M. STUBBLEFIELD
BY
ATTORNEY

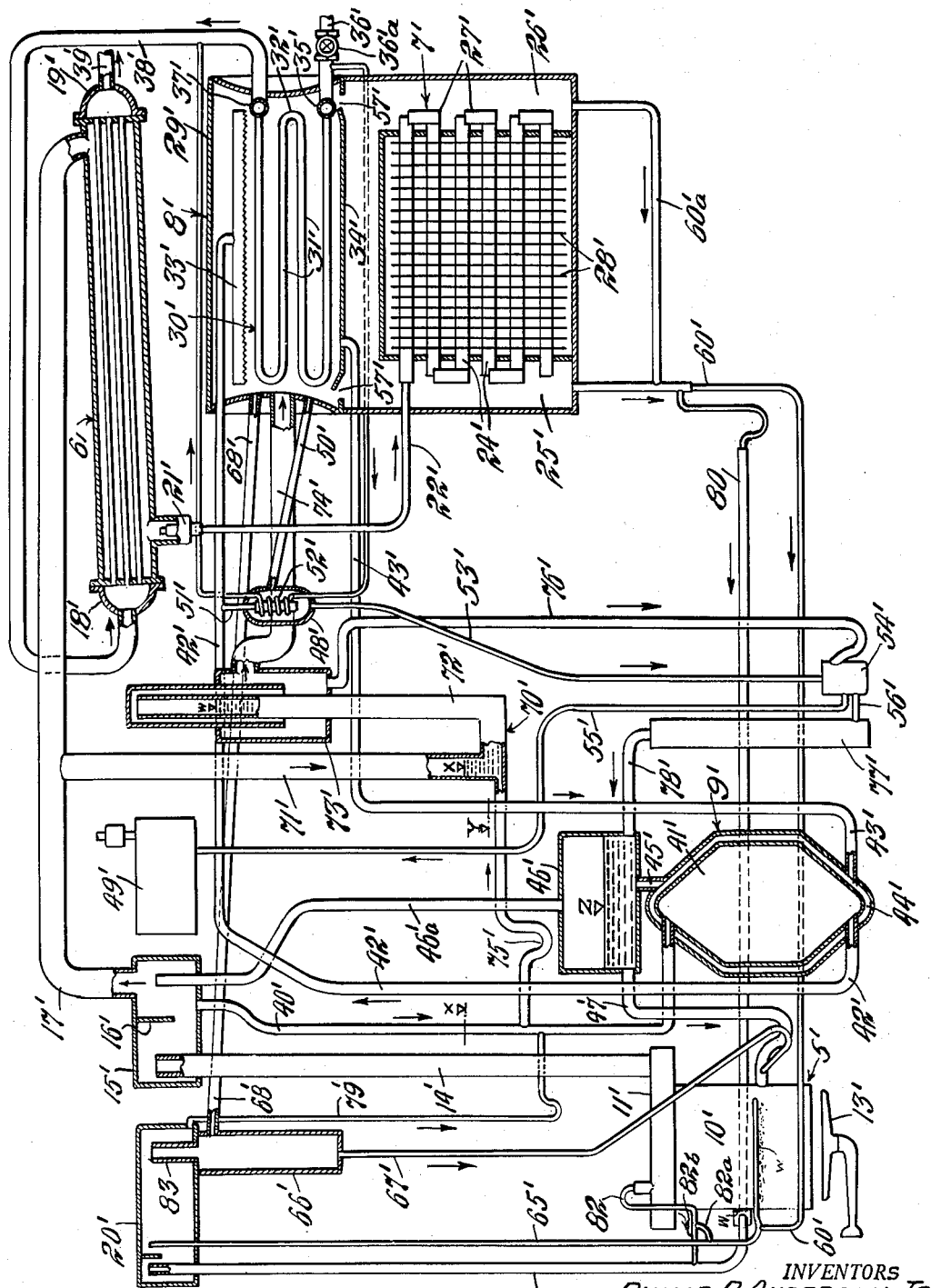

United States Patent Office 2,749,095
Patented June 5, 1956

2,749,095

AIR CONDITIONING

Philip P. Anderson, Jr., and Edward M. Stubblefield, Evansville, Ind., assignors to Servel, Inc., New York, N. Y., a corporation of Delaware Application August 25, 1952, Serial No. 306,243

9 Claims. (Cl. 257—9)

This invention relates to the art of heating and cooling and particularly to air conditioning wherein the same heat exchanger serves as both a heater and a cooler.

More particularly this invention relates to heating and cooling apparatus which uses an absorption refrigerating system of the two pressure type wherein during cooling cycles of operation air or other media to be cooled is passed in heat exchange relation with the evaporator of such system to be cooled thereby, and during heating cycles of operation the air or other media to be heated is passed in heat exchange relation with the same evaporator, which now functions as a heater. To render the evaporator a heat exchanger for both heating and cooling, the refrigerating system is constructed in a manner that during cooling periods of operation refrigerant vapor is expelled from solution in the generator, condensed to liquid in the condenser and the liquid refrigerant is vaporized in the evaporator to produce the desired cooling effect. Whereas, during heating cycles of operation the refrigerant vapor expelled from solution in the generator is by-passed around the condenser and flows as hot vapor to the evaporator wherein the vapor is condensed giving up its latent heat of condensation to air or other media thereby heating such media. The copending application for Letters Patent of Norton E. Berry, Serial No. 286,677, filed May 8, 1952, which copending application is a continuation of and relates back for common subject matter to the abandoned Berry application, Serial No. 703,788, filed October 17, 1946, discloses a heating and cooling system of the above type.

An absorption refrigerating system of the above type operates under a partial vacuum, it is hermetically sealed, evacuated of all air and other gases and is charged with a water solution of a salt such as lithium bromide, or the like. Water, constituting the refrigerant, is expelled from solution by the application of heat to the generator and the concentrated salt solution from which the water has been expelled constitutes the absorbent. In order to meet varying conditions, such as changes in cooling water temperature during cooling operation, it is desirable that the concentration of the absorption solution be varied. As explained hereinafter, with high cooling water temperatures the solution should be rather concentrated and with low cooling water temperatures the solution should be somewhat dilute. However, when a system of this type is operating on a heating cycle, it is desirable that the refrigerant-absorbent solution in the active circuit be dilute at all times. A dilute solution not only boils more readily at the beginning of a cycle of operation, it also permits the generator to operate at lower temperatures during heating cycles of operation than would be possible if a solution of the same concentration be circulated through the active circuit on both heating and cooling cycles. In a system of this type, the corrosion rate increases with temperature—approximately doubling for each 10° C. rise. Therefore, the operating temperature of generator should be as low as possible and still do a good job of heating and cooling.

The problem of varying the concentration of the refrigerant-absorbent solution during cooling cycles of operation has been taken care of very nicely in a manner disclosed and claimed in the United States Patent to Lowell McNeely No. 2,465,904, granted March 29, 1949. However, the system disclosed in this patent makes no provisions for diluting the solution during heating cycles beyond that of cooling cycles.

We have discovered a new method of and apparatus for heating and/or cooling wherein: during cooling cycle operation the concentration of the absorption solution in the active solution circuit varies in accordance with varying operating conditions; and during heating cycle operation the solution in the active circuit is more dilute than at any time during cooling cycle operation.

Broadly, the above objectives are attained by providing a system wherein: the refrigerating unit is originally charged with a refrigerant-absorbent solution that is more dilute—contains more refrigerant—than would be the case were the unit to be used only for cooling; refrigerant not needed during cooling cycle operation is withdrawn from the active solution circuit, stored during cooling cycle operation and during shut-down periods following a cooling cycle, and returned to the active circuit at the beginning of a heating cycle operation; refrigerant is variously withdrawn and returned to the active circuit in varying quantities during cooling cycle operation in accordance with operating conditions, and this refrigerant is all returned to the active circuit at the end of each cooling cycle operation; and absorption solution is stored out of the active circuit during heating cycle operation and returned to the active circuit at the beginning of a cooling cycle operation.

The expression "active circuit" is intended to signify that part, or parts, of the system through which fluid flows during operation of the system. As will appear hereinafter, a part of the system may be active on cooling cycle operation and temporarily inactive on heating cycle operation, and vice versa.

For purpose of illustration, this invention has been incorporated in a heating and cooling system generally similar to that disclosed and claimed in a concurrently filed patent application, Serial No. 306,242, filed August 25, 1952, of Philip P. Anderson, Jr., one of the joint inventors herein. Reference is made also to a concurrently filed patent application of Norton E. Berry, Serial No. 306,241, filed August 25, 1952, and which Berry application discloses and claims matter disclosed in both the instant application and the above concurrently filed Anderson application.

The arrangement herein described by-passes absorption solution around the absorber and the liquid heat exchanger during heating cycles and utilizes the liquid heat exchanger and certain of the connecting conduits between the heat exchanger, generator and absorber for storing absorption solution out of the active circuit during heating cycles. Furthermore, when the system is shifted from a heating to a cooling cycle, water for dilution is stored in a separate vessel out of the active circuit and held in storage until such time as the system is shifted back to a heating cycle at which time the water is dumped back into the active circuit.

The invention together with its objects and advantages is set forth in more technical detail in the following description and accompanying drawing in which:

Fig. 1 is a diagrammatic illustration of a heating and cooling system incorporating one embodiment of this invention; and Fig. 2 is a diagrammatic illustration of such a system incorporating another embodiment of the invention.

Referring to Fig. 1, this system includes a generator 5, a condenser 6, an evaporator or heat exchanger 7, an absorber 8 and a liquid heat exchanger 9 interconnected for the circulation of refrigerant and absorbent.

The generator 5 may take other forms and as illustrated in the drawing is generally similar to that illustrated and described in the United States application for Letters Patent of Norton E. Berry, Serial No. 164,059, filed May 25, 1950, now Patent No. 2,625,800, issued January 20, 1953. Suffice it to state herein that the generator 5 comprises a horizontally arranged cylindrical vessel 10 closed at both ends and having a vapor dome or chamber 11 located at the top thereof preferably at one end. A flue 12 extends axially of the generator vessel 10 through which the products of combustion from a gas burner 13 or the like flow to heat the solution. The lower end of a vertical vapor liquid-lift tube 14 projects into the vapor chamber 11 and a separating chamber 15 surrounds and encloses the upper end of the lift conduit. Baffles 16, in the separating chamber 15, separate the refrigerant vapor from solution issuing from the upper end of the lift conduit.

A vapor pipe 17 connects the separating chamber 15 to the condenser 6. The condenser 6 comprises a conventional shell forming a chamber with water tubes extending therethrough between headers 18 and 19. Liquid refrigerant condensed in the condenser 6 flows therefrom into a storage vessel 20, to be described in more detail hereinafter. A device 21 in the top of storage vessel 20 has an orifice therein for permitting the flow of liquid refrigerant and non-condensable gases while maintaining the difference in pressure between the condenser and evaporator as illustrated and described in United States Letters Patent to Norton E. Berry, No. 2,563,575, granted August 7, 1951. From the storage vessel 20, the refrigerant overflows through a conduit 22 into the evaporator 7.

The evaporator 7 comprises a series of tubes 24 arranged one over the other with their ends extending into spaced headers 25 and 26. Cups 27, mounted at the ends of alternate tubes of each row in the respective headers 25 and 26, underlie the end of the next uppermost tube so that refrigerant flows by gravity through successive tubes from the top to the bottom of the evaporator. The headers 25 and 26 are connected to deliver refrigerant vapor from the evaporator tubes 24 to the absorber 8. Heat transfer fins 28 are arranged in spaced relation on the evaporator tubes 24 and, during cooling cycles, air or other media to be cooled flows over the tubes and between the fins.

The absorber 8 comprises a shell 29 enclosing a serpentine coil or series of coils 30 arranged in parallel. Each coil 30 comprises a plurality of straight tube sections 31 arranged one over the other in a vertical plane with the ends of the alternate tubes connected by elbows 32 to provide a continuous serpentine coil. Overlying the serpentine coil 30 or plurality of such coils is a liquid distributor 33 for delivering absorption solution weak in refrigerant onto the uppermost horizontal tube section 31 of each coil which solution drips from each coil section to the next lower coil section from the top to the bottom of the absorber. Underlying the coils 30 is a tray 34 for collecting absorption solution dripping from the coils. The lower or inlet ends of the coils 30 are connected by a header 35 and the header, in turn, is connected by a conduit 36 to a supply of cooling water such as a city main or a cooling tower. The conduit 36 is provided with a valve 36a for controlling the flow of water therethrough. The upper or outlet ends of the coils 30 are connected by a header 37 which, in turn, is connected by a conduit 38 to the header 18 of the condenser 6. Thus, with the valve 36a open, cooling water flows through the absorber coils and the tubes of the condenser, successively, and the cooling water is discharged from the outlet header 19 of the condenser through a discharge conduit 39.

During cooling cycle operation, absorption solution weak in refrigerant is delivered from the separating chamber 15 to the solution distributor 33 in the absorber 8 through a path of flow comprising a conduit 40, an outer passage 41 of the liquid heat exchanger 9 and a conduit 42. Absorption solution strong in refrigerant flows from the tray 34 at the bottom of the absorber 8 to the generator 5 in a path of flow comprising a conduit 43, an inner passage 44 of the liquid heat exchanger 9, a conduit 45, a leveling vessel 46, and a conduit 47. A vent conduit 46a connects the leveling vessel 46 to the separating chamber 15. Thus, during cooling periods of operation, the absorption solution circuit comprises the generator 5, vapor liquid-lift 14, liquid heat exchanger 9 and absorber 8 so connected and arranged that absorption solution raised by the vapor liquid-lift flows to the absorber and back to the generator by gravity. During cooling cycles of operation of the system solution will stand at some level $x$ in conduit 40 connected to conduit 42 through the liquid heat exchanger 9, at a level $y$ in conduit 43, and at a level $z$ in the leveling chamber 46.

A purge device 48, generally similar to that described and claimed in United States patent to Lowell McNeely No. 2,473,384, issued June 14, 1949, is provided for continually withdrawing surplus non-condensable gases from the system and transferring them to a storage vessel 49. The purge device 48 comprises an auxiliary absorber vessel connected to the main absorber 8 through a suction tube 50. The purge device 48 has a connection 51 to conduit 42 for supplying absorption solution weak in refrigerant thereto, a cooling coil 52 therein connected between the conduits 36 and 38 and a fall tube 53 depending from the bottom thereof. A separating chamber or gas trap 54 receives the lower end of the fall tube 53 and is connected by a riser 55 to the gas storage vessel 49. A conduit 56 connects the gas trap 54 to a vessel 77, to be described in more detail hereinafter. For a detailed description of this purge device reference may be had to the above McNeely patent.

The evaporator 7 is located below the absorber 8 and the headers 25 and 26 are connected through openings 57 to the bottom of the absorber shell 29. The bottom of the evaporator 7 is located above the lowest static liquid level existing in the absorption solution circuit in the leveling chamber 46 or in the generator 5 between periods of operation, and means are provided to drain liquid from the evaporator to the absorption solution circuit between periods of operation and lift any unevaporated liquid refrigerant or condensate from the bottom of the evaporator into a concentration control arrangement during periods of operation. As illustrated, the drain means comprises a depending U-shaped conduit 60 having its upper end connected to the bottom of the evaporator header 25 and its lower end connected to the bottom of an auxiliary vapor liquid-lift chamber 61. A branch conduit 60a connects the bottom of the evaporator header 26 to the down leg of conduit 60. The up leg of conduit 60 is heated by thermal contact with the generator shell 10 to which it is welded, as indicated at W. One side of the auxiliary vapor liquid-lift chamber 61 is connected by a horizontal conduit 62 to the vapor dome or chamber 11 of the generator vessel 10. The conduit 60, auxiliary lift chamber 61 and conduit 62 are so arranged as to provide a hydraulic gradient from the bottom of the evaporator headers 25 and 26 to the vapor chamber 11 of the generator 5 for gravity flow of liquid therethrough and a riser for producing a hydrostatic reaction head on the auxiliary lift chamber. A septum 63 having an orifice 64 therein is located in the vapor liquid-lift chamber 61 adjacent one end of the conduit 62. The orifice 64 is of such size as to permit absorption solution or liquid refrigerant to flow slowly from the evaporator headers 25 and 26 to the vapor chamber 11 of generator 5 between periods of operation while limiting the amount of vapor flowing from the generator to the auxiliary vapor liquid-lift chamber 61 during periods of operation.

An auxiliary vapor liquid-lift tube 65 has its lower end projecting into the dome of chamber 61 in the drain conduit and its upper end is connected to the top of a concentration control vessel 66. The concentration control vessel 66 is generally similar to that described and claimed in United States Letters Patent to Lowell McNeely No. 2,465,904, issued March 29, 1949. The bottom of the vessel 66 is connected by a down tube 67 to the generator 5. The concentration control vessel is located above the liquid level z in the leveling chamber 46 a distance sufficient to maintain a column of liquid refrigerant in tube 67 and in the vessel 66 of a height to balance the difference in pressure between the absorber 8 and the generator 5 on cooling cycles. A vent tube 68 connects the shell 29 of the absorber 8 to the interior of the concentration control vessel 66 to maintain the pressure therein the same as that in the absorber.

During cooling cycles of operation, liquid refrigerant introduced into the concentration control vessel 66 will displace any other liquid therein and be temporarily stored as a liquid column of a height to balance the difference in pressure between the absorber 8 and the generator 5. Such storage of liquid refrigerant out of the absorption solution circuit increases the concentration of the absorption solution which, in turn, reduces the vapor pressure and temperature in the evaporator 7 to increase the rate of evaporation therein. The storage of liquid refrigerant in the concentration control vessel 66 continues until all of the refrigerant supplied to the evaporator 7 is evaporated therein. Such a concentration control operates advantageously to compensate for changes in operating conditions such as the cooling water temperature. At high cooling water temperatures the height of the pressure balancing liquid column and the amount of refrigerant stored increases and at low cooling water temperatures the height of the liquid column and amount of refrigerant stored decreases. At the end of a cooling cycle operation, any liquid refrigerant contained in the vessel 66 will drain therefrom through conduit 67 into the vessel 10 of the generator.

A vapor by-pass, generally similar to that described and claimed in the above patent application of Norton E. Berry Serial No. 306,241 filed concurrently herewith, is connected between the high and low pressure sides of the system for flow of hot vapor from the generator to the evaporator during heating cycles of operation. This vapor by-pass comprises a liquid trap 70 having a down leg 71 connected to the top of the separating chamber 15 and an up leg 72 projecting into the top of an auxiliary separating chamber 73. A vapor conduit 74 connects the auxiliary separating chamber 73 to the shell 29 of the absorber for flow of vapor to the absorber shell, which vapor flows through the openings 57 into the headers 25 and 26 of the evaporator. If desired, the conduit 74 may be connected directly to one or both of the evaporator headers. Weak absorption solution is fed into the liquid trap 70 from the weak solution conduit 40 through a small liquid trap 75. The presence of the trap 75 in the line between the conduit 40 and the trap 70 minimizes the flow of hot solution to the trap 70 by convection during cooling cycle operation. This is desirable since any such flow of hot solution may result in some flashing of solution in the up leg 72 with resultant loss of uncondensed refrigerant vapor during cooling cycles of operation.

An additional liquid trap comprising a conduit 76, the gas trap 54, the conduit 56, the vessel 77 and a conduit 78 connects the auxiliary separating chamber 73 to the leveling chamber 46 for flow of weak solution to the leveling chamber during heating cycles of operation and for balancing the pressure between the high and low pressure sides of the system during cooling cycles of operation. The vessel 77 is of such volume as to insure that the liquid trap of which it is a part, between the leveling chamber 46 and the auxiliary separating chamber 73 always contains sufficient solution to maintain a liquid seal regardless of fluctuations in solution level in the leveling chamber. A conduit 79 in the form of a liquid trap connects the bottom of the refrigerant storage vessel 20 to the bottom of the liquid trap 70.

When the system is operating on a cooling cycle with the highest practical temperature of cooling water flowing from the conduit 36 into and through the absorber cooling coil and from there through the conduit 38 into and through the condenser cooling tubes, the absorption solution level in the down leg 71 of the trap 70 will be just above the bottom of the trap as indicated at x corresponding substantially to the effective solution level in the weak solution conduit 40 leading from the vapor separating chamber 15. The solution level w in the up leg 72 of trap 70 and in the trap 79 will generally be that of the top of the weak solution conduit 42 leading to the absorber distributor 33. However, under certain conditions the solution densities involved may be such that this level will be somewhat above or below this point. Accordingly, the up leg 72 of the trap 70 is sufficiently extended to prevent blowing of this trap under unusual conditions of cooling cycle operation.

At the beginning of a heating cycle of operation of the system, the valve 36a in the cooling water line 36 is closed, either manually or automatically, so that cooling water does not flow through the cooling coil of the absorber or the tubes of the condenser. If desired, the valve 36a may be constructed as a drain valve which when closed to conduit 36 will be open to the header 35 for draining cooling water from the absorber and condenser during heating cycle operation. Now, as the high side pressure rises above the maximum allowed on cooling cycle operations, the trap 70 is blown of liquid and vapor passes from the separating chamber 15 into and through the trap 70, through the auxiliary vapor separating chamber 73, through conduit 74 into the absorber shell 29, and from there the vapor flows through the openings 57 into the headers 25 and 26 of the evaporator 7, which evaporator now functions as a heating element.

At the same time, weak absorption solution flows from the separating chamber 15 through the upper portion of conduit 40, through the liquid trap 75 into the bottom of the trap 70, through which the solution is carried by means of the flowing vapor through the up leg 72 and into the auxiliary separating chamber 73, where the liquid is separated from the generator vapor. Also the liquid refrigerant that has been stored in vessel 20 is dumped through trap 79 into trap 70 wherein the refrigerant is mixed with the absorption solution passing therethrough diluting such solution. The dilute solution flows from the bottom of the auxiliary separating chamber 73 through the conduit 76, gas trap 54, conduit 56, vessel 77, conduit 78, leveling vessel 46 and conduit 47 back to the generator 5.

The effect of the carrying of absorption solution through the trap 70 in the above manner is to reduce the pressure difference between the high and low pressure sides of the system from that of the maximum provided for on cooling cycles of operation to only that required as reaction head to effect the carrying of the solution through the trap 70 on heating cycles of operation. The use of the auxiliary separating chamber 73, conduit 76, gas trap 54, conduit 56, vessel 77 and conduit 78 makes it possible to return the hot weak solution to the generator without passing through the absorber 8, the liquid heat exchanger 9 and interconnecting conduits during heating cycles of operation. In other words during heating cycles of operation, solution stands more or less dormant in the lower portion of conduit 40, the outer passage 41 of the liquid heat exchanger, conduit 42, conduit 43, the inner passage 44 of the liquid heat exchanger and conduit 45. Thus, the solution standing in these elements is in effect withdrawn from the active solution circuit during heating cycles of operation and the amount of water required to dilute the solution in the active circuit is reduced. Furthermore, the liquid refrigerant that is dumped from the storage vessel 20 is mixed only with the solution in the active circuit during heating cycles.

Conduit 76 may be connected directly between the auxiliary separating chamber 73 and the vessel 77 for flow for absorption solution to the latter during heating cycle operation. However, by flowing absorption solution from the auxiliary separating chamber 73 through conduit 76 into the gas trap 54 and from there through conduit 56 into the vessel 77, any refrigerant vapor that may condense in the auxiliary absorber of the purge device 48 and flow therefrom as liquid refrigerant through conduit 53 into the gas trap 54, during heating cycle operation, will be picked up by the absorption solution flowing through the gas trap 54 and returned therewith to the generator. Otherwise, the liquid refrigerant flowing into the gas trap 54 during heating cycle operation may find its way into and through the riser 55 to the gas storage vessel 49, thereby robbing the system of a part of its charge of liquid refrigerant during heating cycle operation.

The hot generator vapor that is introduced into the headers 25 and 26 of the evaporator passes into and through the evaporator tubes 24 wherein the vapor is condensed giving up its latent heat of condensation to air or other media that passes over the exterior of the tubes thereby heating such media. The condensate formed in the evaporator tubes flows from the lowermost of said tubes into the header 25 and from there into conduit 60. Any condensate formed in the header 26 of the evaporator flows therefrom through conduit 60a into conduit 60. From conduit 60, the condensate flows into vessel 61 from whence it is lifted through the auxiliary vapor lift 65 into the concentration control vessel 66. Since the difference in pressure between the generator and absorber during heating cycles is insufficient to hold the condensate in vessel 66, it flows therefrom through conduit 67 into the bottom of the generator 5, and the lifting vapor flows through conduit 68 into the absorber shell 29 wherein it joins the generator vapor flowing thereto through conduit 74.

To shift from a heating cycle to a cooling cycle of operation all that is necessary is that the control valve 36a in the cooling water line 36 be open for flow of water through the absorber cooling coil and through the condenser cooling tubes, so that now the vapor flowing from the generator is condensed in the condenser, the pressure in the high side of the system is reduced and the liquid traps 70 and 79 are again established whereupon the flow of vapor and absorption solution through the system is the same as that described above in connection with the cooling cycle operation. In other words the system may be shifted from a heating cycle to a cooling cycle and from a cooling cycle to a heating cycle by merely opening or closing the valve 36a in the cooling water line 36.

It is to be noted that, although the up leg 72 of the trap 70 extends an appreciable distance above the level *w* at which absorption solution discharges from conduit 42 into the absorber distributor 33 during cooling cycles of operation, no solution will discharge from this conduit into the absorber distributor during heating cycles of operation. This follows from the fact that during heating cycles of operation the fluid passing through the up leg 72 of the trap 70 is mostly vapor and therefore much lighter than the solution in the conduit 42. By the same reasoning, during cooling cycles of operation, except for occasional flashing in the up leg 72, solution will stand at substantially the level *w* in this leg of the trap and solution will overflow from conduit 42 into the absorber distributor 33.

Furthermore, since the liquid refrigerant held in storage as a liquid column in trap 79 and in storage vessel 20 during cooling cycle operation is much lighter than the absorption solution held in the up leg 72 of trap 70, the top of the liquid refrigerant column in storage vessel 20 will extend to the point of overflow into conduit 22. During shutdown periods between cooling cycle operations, the solution in the down leg 72 and up leg 72 of trap 70 will tend to seek a common level and some of the liquid refrigerant from trap 79 and vessel 20 may flow into trap 70. However, as soon as the system is again started up on a cooling cycle operation, the cooling cycle levels will be reestablished. It is to be understood, of course that the drawing is not to scale, and that for purposes of illustration the heights of the columns of liquids may be somewhat exaggerated. The vessel 20 is of such volume and cross-sectional area that the level of liquid stored therein will not fluctuate appreciably with fluctuations of solution levels in the trap 70 during cooling cycle operations.

To sum up, during cooling cycles of operation vapor generated in the generator 5 passes upward through the vapor lift 14 lifting droplets of weak absorption solution therewith into the separating chamber 15. The vapor separates from the weak absorption solution and flows through conduit 17 into the condenser 6 wherein the vapor is condensed to liquid and the liquid flows through the orifice device 21 into the refrigerant storage vessel 20. The traps 70 and 79 having been filled with absorption solution, the vessel 20 is filled with liquid refrigerant to the point of overflow into conduit 22. Thereafter, the liquid refrigerant flows through conduit 22 into and through the evaporator tubes 24, which tubes now function as a cooler. The liquid evaporates in the tubes 24 and cools the air or other media flowing over the exterior thereof. Any unevaporated liquid refrigerant that flows from the lowermost tube 24 of the evaporator enters the header 25 and drains through conduit 60 into vessel 61. From vessel 61, the liquid refrigerant is lifted through the vapor lift 65 into the concentration control vessel 66 wherein it is temporarily stored. Storage of liquid refrigerant out of the absorption solution circuit increases the concentration of the absorption solution which, in turn, reduces the vapor pressure and temperature in the evaporator 7 to increase the rate of evaporation therein. The weak absorption solution flows from the separating chamber 15 through conduit 40, the outer passage 41 of the liquid heat exchanger 9 and conduit 42 into the distributor 33 of the absorber 8. The weak absorption solution flows downward over the absorber cooling coil 30 absorbing refrigerant vapor which passes from the headers 25 and 26 of the evaporator into the absorber. The strong absorption solution flows from the absorber tray 34 through conduit 43, the inner passage 44 of the heat exchanger, conduit 45, leveling vessel 46 and conduit 47 back to the generator 5. The fluids in liquid trap 70, the connecting vapor conduits between the separating chamber 15 and the absorber shell 29, and in the conduit 76, vessel 77 and conduit 78 between the auxiliary separating chamber 73 and the leveling vessel 46, stand more or less dormant during the above cooling cycle operation. Also the fluids in liquid trap 79 and storage vessel 20, up to the point of overflow into conduit 22 stand dormant, with vessel 20 holding liquid refrigerant in storage up to the point of overflow into conduit 22.

During heating cycle operations, the liquid is blown from trap 70 into the auxiliary separating chamber 73 and generator vapor passes from the separating chamber 15 through trap 70, through the up leg 72 into the separating chamber 73, and from there the vapor flows through conduit 74 into and through the absorber shell 29, and through the openings 57 into the evaporator headers 25 and 26. From the headers 25 and 26 the generator vapor passes through the tubes 24 of the evaporator, which tubes now function as heating elements to heat air or other media passing thereover. The vapor is condensed in the evaporator tubes and flows as liquid from the lowermost tube into and through the header 25, conduit 60, vessel 61, and vapor lift 65 into vessel 66. The pressure difference between the generator 5 and the vessel 66 not being high enough to hold the condensate in vessel 66, the condensate flows through conduit 67 to the generator 5. The weak absorption solution lifted by the vapor lift 14 into the separating chamber 15 flows therefrom through conduit 40 and trap 75 into the trap 70 wherein this absorption solution is picked up by the high velocity vapor flowing through the trap 70 and carried through the up leg 72 into the separating chamber 73. At the same time that liquid is blown from the trap 70, the liquid refrigerant that is stored in vessel 20 passes therefrom through conduit 79 into trap 70 wherein this liquid mixes with the weak absorption solution passing therethrough and is carried along with such absorption solution into the separating chamber 73. The now diluted absorption solution passes from chamber 73, through conduit 76, gas trap 54, conduit 56, vessel 77, conduit 78, leveling vessel 46 and conduit 47 back to the generator 5. During heating cycles of operation, the fluids in conduit 17, condenser 6, vessel 20 and conduit 22 stand more or less dormant, while the lower portion of conduit 40, the outer passage 41 of the liquid heat exchanger, conduit 42, conduit 43, the inner passage 44 of the liquid heat exchanger and conduit 45 hold absorption solution in storage out of the active solution circuit.

The embodiment of the invention illustrated in Fig. 2 of the drawings is quite similar to and operates generally in the same manner as that described above with reference to Fig. 1. To designate parts in Fig. 2 like those of Fig. 1, the same reference characters are used, except that in Fig. 2, the reference characters are primed.

Referring to Fig. 2, this system includes a generator 5', a condenser 6', an evaporator or heat exchanger 7', an absorber 8' and a liquid heat exchanger 9' interconnected for the circulation of refrigerant and absorbent. The generator 5' comprises a vertically arranged cylindrical vessel 10' closed at both ends and having a vapor dome or chamber 11' located at the top thereof. A plurality of flues, not shown, extend axially of the generator vessel 10' through which the products of combustion from a gas burner 13' flow to heat the solution. The lower end of a vertical vapor liquid-lift tube 14' projects into the vapor dome 11' and a separating chamber 15' surrounds and encloses the upper end of the lift conduit. Baffles 16' in the separating chamber 15' separate the refrigerant vapor from solution issuing from the upper end of the lift conduit.

A vapor pipe 17' connects the separating chamber 15' to the condenser 6'. The condenser 6' comprises a conventional shell forming a chamber with water tubes extending therethrough between headers 18' and 19'. Liquid refrigerant condensed in condenser 6' flows to the evaporator 7' through a conduit 22'. A device 21' in conduit 22' has an orifice therein for permitting the flow of liquid refrigerant and non-condensable gases while maintaining the difference in pressure between the condenser and evaporator.

The evaporator 7' comprises a series of tubes 24' arranged one over the other with their ends extending into spaced headers 25' and 26'. Cups 27', mounted at the ends of alternate tubes of each row in the respective headers 25' and 26', underlie the end of the next uppermost tube so that refrigerant flows by gravity through successive tubes from the top to the bottom of the evaporator. The headers 25' and 26' are connected to deliver refrigerant vapor from the evaporator tubes 24' to the absorber 8'. Heat transfer fins 28' are arranged in spaced relation on the evaporator tubes 24' and during cooling cycles, air or other media to be cooled flows over the tubes and between the fins.

The absorber 8' comprises a shell 29' enclosing a serpentine coil or series of coils 30' arranged in parallel. Each coil 30' comprises a plurality of straight tube sections 31' arranged one over the other in a vertical plane with the ends of the alternate tubes connected by elbows 32' to provide a continuous serpentine coil. Overlying the serpentine coil 30' or plurality of such coils is a liquid distributor 33'. Underlying the coils 30' is a tray 34' for collecting absorption solution dripping from the coils. The lower or inlet ends of the coils 30' are connected by a header 35' and the header, in turn, is connected by a conduit 36' to a supply of cooling water. The conduit 36' is provided with a valve 36a' for controlling the flow of water therethrough. The upper or outlet ends of the coils 30' are connected by a header 37' which, in turn, is connected by a conduit 38' to the header 18' of the condenser 6'.

During cooling cycle operation absorption solution weak in refrigerant is delivered from the separating chamber 15' to the liquid distributor 33' in the absorber 8' through a path of flow comprising a conduit 40', an inner passage 41' of the liquid heat exchanger 9' and a conduit 42'. Absorption solution strong in refrigerant flows from the trays 34' at the bottom of the absorber 8' to the generator 5' in a path of flow comprising a conduit 43', an outer passage 44' of the liquid heat exchanger 9', a conduit 45', a leveling vessel 46', and a conduit 47'. A vent conduit 46a' connects the leveling vessel 46' to the separating chamber 15'. During cooling cycles of operation of the system solution will stand at some level $x$ in conduit 40' connected to conduit 42' through the liquid heat exchanger 9', at a level $y$ in conduit 43', and at a level $z$ in the leveling chamber 46'.

A purge device 48' is provided for continually withdrawing surplus non-condensable gases from the system and transferring them to a storage vessel 49'. The purge device 48' comprises an auxiliary absorber vessel connected to the main absorber 8' through a suction tube 50'. The purge device 48' has a connection 51' to conduit 42' for supplying absorption solution weak in refrigerant thereto, a cooling coil 52' therein connected between the conduits 36' and 38' and a fall tube 53' depending from the bottom thereof. A separating chamber or gas trap 54' receives the lower end of the fall tube 53' and is connected by a riser 55' to the gas storage vessel 49' and by a conduit 56' to the absorption solution circuit.

The evaporator 7' is located below the absorber 8' and the headers 25' and 26' are connected through openings 57' to the bottom of the absorber shell 29'. An evaporator drain means comprises a depending U-shaped conduit 60' having its inlet end connected to the bottom of the evaporator headers 25' and its outlet end connected to the bottom of an auxiliary vapor liquid-lift conduit 65'. A branch conduit 60a' connects the bottom of the evaporator header 26' to the down leg of conduit 60'. The lower end of vapor lift conduit 65' is provided with a dead end portion that is welded or otherwise secured in thermal contact with the shell 10' of the generator to be heated thereby. A branch conduit 80, to be described in more detail hereinafter, leads from the drain conduit 60' to a second auxiliary vapor liquid-lift conduit 81. The outlet end of conduit 80 is heated by thermal contact with the generator shell 10 to which it is welded, as indicated at W. To prevent surging of liquid in the conduits 60' and 80, each of these conduits is provided with an orifice, not shown.

A vapor conduit 82, provided with branches 82a and 82b, each having an orifice therein not shown, connects the vapor dome 11' with the vapor lift conduits 65' and 81, respectively. The vapor conduit 82 and branches 82a and 82b provide for a limited flow of vapor from the dome 11 into the vapor lifts 65' and 81, which vapor promotes boiling and reduces superheating of the liquid refrigerant in the vapor lifts 65' and 81. Also the conduit 82 and branches 82a and 82b provide a path of flow for liquid from the evaporator to the generator during off periods. The upper or outlet ends of each of the vapor lifts 65' and 81 extend into a refrigerant storage vessel 20'.

The particular manner of lifting overflow liquid from the bottom of the evaporator into vessel 20' is not our invention, but is the invention of Robert K. Spear, which invention is disclosed and claimed in a concurrently filed patent application Serial No. 306,244 filed August 25, 1952. For a detailed description of the manner of operating the vapor lifts 65' and 81, reference may be had to the above Spear patent application.

The refrigerant storage vessel 20' is connected by a liquid trap 79' to the weak absorption solution line 40' leading from the separating chamber 15' and by an overflow conduit 83 to a concentration control vessel 66'. The bottom of the concentration control vessel is connected by a down tube 67' to the conduit 47' leading into the bottom of the generator 5'. A vent tube 68' connects the top of the concentration control vessel 66' to the interior of the absorber shell 29'. As will appear hereinafter, this concentration control operates in substantially the same manner as that described above in connection with the concentration control 66 of Fig. 1.

A vapor by-pass comprises a liquid trap 70' having a down leg 71' connected to the vapor conduit 17' and an up leg 72' projecting into the top of an auxiliary separating chamber 73'. A vapor conduit 74' connects the auxiliary separating chamber 73' to the shell 29' of the absorber for flow of vapor to the absorber shell, which vapor flows through the openings 57' into the headers 25' and 26' of the evaporator. Weak absorption solution is fed into the liquid trap 70' from the weak solution conduit 40' through a liquid trap 75'. A liquid trap comprising a conduit 76', the gas trap 54', the conduit 56', a vessel 77', and a conduit 78' connects the auxiliary separating chamber 73' to the leveling chamber 46' for flow of weak solution to the leveling chamber during heating cycles of operation and for balancing the pressure between the high and low pressure sides of the system during cooling cycles of operation.

At the beginning of a heating cycle of operation of the system, the valve 36a' in the cooling water line 36' is closed, either manually or automatically, so that cooling water does not flow through the absorber or condenser. Now, as the high side pressure rises above the maximum allowed on cooling cycle operations, the trap 70' is blown of liquid and vapor passes from the separating chamber 15', through conduit 17', down leg 71' into and through the trap 70', through the auxiliary vapor separating chamber 73', through conduit 74' into the absorber shell 29', and from there the vapor flows through the openings 57' into the headers 25' and 26' of the evaporator 7', which evaporator now functions as a heating element.

At the same time, weak solution flows from the separating chamber 15' through the upper portion of conduit 40', through the liquid trap 75' into the bottom of the trap 70', through which the solution is carried by means of the flowing vapor through the up leg 72' into the auxiliary separating chamber 73', where the liquid is separated from the generator vapor. Also the liquid refrigerant that has been stored in vessel 20' is dumped through trap 79' into conduit 40', into trap 75', and into trap 70'. The liquid refrigerant from the refrigerant reservoir 20' mixes with absorption solution from conduit 40' and the mixture or dilute absorption solution is blown into the auxiliary separating vessel 73'. The dilute solution flows from the bottom of the auxiliary separating chamber 73' through the conduit 76', gas trap 54', conduit 56', vessel 77', conduit 78', leveling vessel 46' and conduit 47' back to the generator 5'.

As in Fig. 1, during heating cycles of operation, absorption solution stands more or less dormant in the lower portion of conduit 40', the inner passage 41' of the liquid heat exchanger, conduit 42', conduit 43', the outer passage 44' of the liquid heat exchanger and conduit 45'. Thus, the absorption solution standing in these elements is in effect withdrawn from the active solution circuit during heating cycles of operation and the amount of liquid refrigerant required to dilute the solution in the active circuit is reduced. Furthermore, the liquid refrigerant that is dumped from the storage vessel 20' is mixed only with the solution in the active circuit.

The hot generator vapor that is introduced into the headers 25' and 26' of the evaporator passes into and through the evaporator tubes 24' wherein the vapor is condensed giving up its latent heat of condensation to air or other media that passes over the exterior of the tubes thereby heating such media. The condensate formed in the evaporator tubes 24' flows from the lowermost of said tubes into the header 25' and from there into conduit 60'. Any condensate formed in the header 26' of the evaporator flows therefrom through conduit 60a' into conduit 60'. The condensate flows through conduit 60' into the dead end of vapor lift 65'. The thermal contact of the dead end portion of vapor lift 65' with the generator shell 10' provides the necessary heating and consequent vaporization of a part of the condensate for lifting the remaining condensate from conduit 60 through vapor lift 65' into the vessel 20'.

Vapor lift 65' fed by conduit 60' takes care of normal overflow of liquid refrigerant during cooling cycles. However, during heating cycles of operation, the amount of condensate flowing from the evaporator into conduit 60' is apt to be greater than the capacity of the vapor lift 65', in which case, condensate flows from the down leg of conduit 60' into and through conduit 80 to the vapor lift 81. The vapor required for lifting the condensate from conduit 80 through vapor lift 81 into vessel 20' is provided by the thermal contact of the outlet portion of conduit 80 with the shell 10 of the generator. The lifting vapor passes from vessel 20' through overflow 83 and vent conduit 68' into the absorber shell 29'. From vessel 20' the condensate flows through trap 79' into conduit 40' where it mixes with the solution flowing from the separating chamber 15'. This mixture of refrigerant and absorption solution, in other words this dilute solution, is returned to the generator 5' through trap 75', trap 70', up legs 72', auxiliary separating chamber 73', conduit 76', gas trap 54', conduit 56', vessel 77', conduit 78', leveling vessel 46' and conduit 47', as described above. It is to be noted that during heating cycle operation the pressure difference between the high and low pressure sides of the system is relatively low and no storage of liquid refrigerant or condensate will occur in vessel 20'. Also there will be no overflow of liquid from vessel 20' into the concentration control vessel 66'.

As in Fig. 1, to shift from a heating cycle to a cooling cycle of operation all that is necessary is that the control valve 36a' in the cooling water line 36' be open for flow of water through the absorber cooling coil and through the condenser cooling tubes, so that now the vapor flowing from the generator is condensed in the condenser, the pressure in the high side of the system is reduced and the liquid trap 70' is again established, whereupon the flow of refrigerant and absorption solution through the system is the same as that described above in connection with the cooling cycle operation.

Assume that the system has been operating on a heating cycle and is now starting on the cooling cycle. Solution lifted into separating chamber 15' by vapor lift 14' will flow through conduit 40' and trap 75' into the by-pass trap 70' providing a suitable liquid column in the up leg 72' for balancing the pressure difference between the high and low sides of the system, the solution level in the up leg 72' being at the height w the level at which solution enters the absorber from conduit 42'. Trap 79' being in open communication with the low pressure side of the system, solution will also fill this trap to the same height w. Since the solution flowing to the absorber 8' through conduit 42' is dilute, the evaporator temperature will be higher than normal. That is, the liquid refrigerant delivered from the condenser through conduit 22' to the evaporator will not be completely evaporated therein and liquid refrigerant will flow from the lowermost of the tubes 24' into the header 25'.

This excess liquid refrigerant flows from the header 25' through conduit 60' into the auxiliary vapor lift 65' through which it is lifted into the storage vessel 20', where it is held in storage. The liquid refrigerant held in storage in vessel 20' is lighter than the solution in traps 70' and 79', so that the liquid refrigerant cannot displace the solution in the trap 79' and it remains in the storage vessel. When the storage vessel is filled, any liquid refrigerant delivered thereto will overflow through the conduit 83 into the concentration control vessel 66', which handles it in the manner described above in connection with the concentration control 66 of Fig. 1. The liquid refrigerant stored in vessel 20' is held in storage during cooling cycle operation and during shut-down periods between cooling cycle operations. This stored refrigerant is dumped back into the active circuit only when the by-pass trap 70' is blown. Since the by-pass 70' is blown whenever the system changes from a cooling to a heating cycle, the liquid refrigerant stored in vessel 20' is dumped back into the active circuit whenever the system changes from cooling to heating.

Without further description it is thought that the features and advantages of the invention will be readily apparent to those skilled in the art to which this invention appertains, and it will, of course, be understood that changes in form, proportions and minor details of construction may be resorted to without departing from the spirit of the invention and scope of the claims.

What is claimed is:

1. In a heating and cooling system, and absorption refrigeration apparatus of the two pressure type charged with a refrigerant-absorbent solution and including a generator, a condenser, an evaporator which functions as a heater on heating cycles and as a cooler on cooling cycles, an absorber and conduits interconnecting said elements to provide circuits for flow of refrigerant medium and absorption solution and for regulating flow of such fluids therethrough, and means for varying the concentration of the refrigerant-absorbent solution, said means including a first vessel for holding fluid out of circulation during cooling cycle operation and between cooling cycle operations and for returning such fluid to circulation at the beginning of a heating cycle operation, and a second vessel for variously holding liquid refrigerant out of circulation and returning such liquid refrigerant to circulation during cooling cycle operation.

2. A heating and cooling system as set forth in claim 1 wherein liquid refrigerant is held out of circulation in each of said vessels responsive to a change in an internal condition in the apparatus.

3. A heating and cooling system as set forth in claim 1 wherein liquid refrigerant is held out of circulation in each of said vessels responsive to change in pressure difference between the high and low pressure sides of the apparatus.

4. A heating and cooling system as set forth in claim 1 wherein each of said vessels is connected to the apparatus in a manner as to receive liquid refrigerant from the evaporator.

5. A heating and cooling system as set forth in claim 1 wherein said vessels are connected to the apparatus in a manner that the first vessel receives liquid refrigerant enroute from the condenser to the evaporator, and the second vessel receives liquid refrigerant from the evaporator.

6. A heating and cooling system as set forth in claim 1 which includes means for supplying a cooling medium to said condenser and absorber and for controlling the supply of such cooling medium, and wherein liquid refrigerant is held out of circulation in each of said vessels responsive to the supply of cooling medium.

7. In a heating and cooling system, an absorption refrigeration apparatus of the two pressure type charged with a refrigerant-absorbent solution and including a generator, a condenser, an evaporator which functions as a heater on heating cycles and as a cooler on cooling cycles, an absorber and conduits interconnecting said elements to provide circuits for flow of refrigerant medium and absorption solution and for regulating flow of such fluids therethrough, and means for varying the concentration of the refrigerant-absorbent solution, said means including a first vessel for holding absorption solution out of circulation during heating cycle operation, a second vessel for holding liquid refrigerant out of circulation during cooling cycle operation and between cooling cycle operations and a third vessel for holding liquid refrigerant out of circulation during cooling cycle operation.

8. A heating and cooling system as set forth in claim 7 wherein the means for varying the concentration of the refrigerant-absorbent solution includes means for holding absorption solution out of circulation in said first vessel responsive to a lowering of pressure difference between the high and low pressure sides of the apparatus on heating cycle operation, means for holding liquid refrigerant out of circulation in said second vessel responsive to a rise in pressure in the low pressure side of the apparatus on cooling cycle operation and means for holding liquid refrigerant out of circulation in said third vessel responsive to a rise in pressure difference between the high and low pressure sides of the apparatus on cooling cycle operation.

9. A heating and cooling system as set forth in claim 7 which includes means for supplying a cooling medium to said condenser and absorber and for controlling the supply of such cooling medium, and wherein fluid is held out of circulation in each of the three vessels responsive to the supply of cooling medium.

References Cited in the file of this patent

UNITED STATES PATENTS

| | | |
|---|---|---|
| 2,465,904 | McNeely | Mar. 29, 1949 |
| 2,557,573 | Sherwood | June 19, 1951 |
| 2,563,574 | Berry | Aug. 7, 1951 |
| 2,584,250 | Berry | Feb. 5, 1952 |